(12) United States Patent
Giometti et al.

(10) Patent No.: US 7,494,003 B2
(45) Date of Patent: Feb. 24, 2009

(54) OUTFEED MECHANISM FOR STARWHEEL TYPE GLASS INSPECTION MACHINE

(75) Inventors: Stephen M. Giometti, Horseheads, NY (US); Henry F. Raupp, Freeville, NY (US)

(73) Assignee: Emhart Glass S.A. (CH)

( * ) Notice: Subject to any disclaimer, the term of this patent is extended or adjusted under 35 U.S.C. 154(b) by 0 days.

(21) Appl. No.: 11/973,732

(22) Filed: Oct. 9, 2007

(65) Prior Publication Data

US 2008/0078654 A1     Apr. 3, 2008

Related U.S. Application Data

(63) Continuation of application No. 11/237,459, filed on Sep. 27, 2005, now abandoned.

(51) Int. Cl.
*B65G 15/12* (2006.01)
(52) U.S. Cl. .................................................. 198/626.1
(58) Field of Classification Search ............... 198/626.1
See application file for complete search history.

(56) References Cited

U.S. PATENT DOCUMENTS

| | | | | |
|---|---|---|---|---|
| 4,526,270 A | * | 7/1985 | Dichter | 198/453 |
| 4,909,377 A | * | 3/1990 | Bernhard | 198/480.1 |
| 4,934,510 A | * | 6/1990 | Lutgendorf | 198/461.3 |
| 5,261,207 A | * | 11/1993 | Bedin | 53/284.5 |
| 6,460,686 B1 | * | 10/2002 | Giometti et al. | 198/467.1 |
| 6,505,728 B1 | * | 1/2003 | Dion | 198/370.08 |
| 6,745,890 B2 | * | 6/2004 | Nickey et al. | 198/379 |
| 6,848,564 B2 | * | 2/2005 | Nickey et al. | 198/379 |
| 7,261,197 B2 | * | 8/2007 | Nickey et al. | 198/346.2 |

* cited by examiner

*Primary Examiner*—Douglas A Hess
(74) *Attorney, Agent, or Firm*—Reinhart Boerner Van Deuren s.c.

(57) ABSTRACT

A bottle inspection machine is disclosed which has a starwheel feeder and an outfeed mechanism for receiving bottles from the starwheel feeder. The outfeed mechanism has an inner belt conveyor which has a pickoff wheel adjacent the starwheel feeder and a second wheel. At least one drive belt is supported by the pickoff and second wheels for defining a linear outfeed belt portion. The outfeed mechanism also has an outer serpentine belt conveyor which has an idler wheel located radially inwardly from the pick off wheel which defines an opening for receiving a bottle displaced by the starwheel feeder and a third wheel. At least one flexible serpentine belt is supported by the idler and third wheels which are located to define a location where a bottle will be discharged from the outfeed mechanism. The serpentine belt is sufficiently flexible so that a bottle displaced into the opening between the pickoff and idler wheels will be conveyed by the serpentine and inner belts with the serpentine belt changing its configuration as the bottle is conveyed to the discharge location.

1 Claim, 2 Drawing Sheets

OUTFEED MECHANISM FOR STARWHEEL TYPE GLASS INSPECTION MACHINE

The present invention is a Continuation of U.S. patent application Ser. No. 11/237,459, filed Sep. 27, 2005, now abandoned The present invention relates to outfeed mechanisms for bottle inspection machines.

BACKGROUND OF THE INVENTION

U.S. Pat. No. 6,460,686, discloses a machine that inspects glass bottles. This machine is an indexing, starwheel type machine. Containers enter a starwheel by use of a timing feed screw. This feed screw releases containers in time with starwheel displacement such that each container enters an open pocket. The starwheel then indexes rotationally a fixed amount and stops or dwells. Various forms of inspection take place at each dwell position. The starwheel continues the index and dwell cycle. After the last dwell station, the container is removed from the starwheel with guides on opposing sides of the container. The outside guide is fixed and the inside guide is a moving guide (the end portion of a belt conveyor), which provides a motive force that drives the container out of the starwheel and into the transfer mechanism.

With this methodology, the container rolls along the fixed guide. It is driven by the moving guide. The forward velocity of this container along the fixed guide can be shown to be equal to one half the linear velocity of the moving guide. The transfer mechanism consists of the above discussed belt conveyor and a second conveyor operatively associated with a forward portion of the first belt conveyor. These belt conveyors travel at identical velocities. Once the container reaches the end of the fixed guide, it contacts the second belt conveyor which with the first belt conveyor, causes the container to double its velocity, to match the speed of the belt conveyors.

The first belt conveyor must be moving fast enough to prevent two adjacent containers from coming into contact. Once the containers reach the second belt conveyor, the spacing doubles due to the doubling of their forward velocity. The drawback to this method is that the containers are traveling at a high velocity as they exit the machine. This high velocity must be transferred to the downstream conveyors, as it is desirable to closely match conveyor speeds for container stability. If this speed could be reduced, it would improve downstream stability, thus reducing the falling over of containers and resulting stoppages.

OBJECTS OF THE INVENTION

It is accordingly an object of the present invention to provide an outfeed mechanism for a high-speed bottle inspection machine of the type described that will enhance the stability of round containers and improve the reliability of handling non-round containers.

Other objects and advantages of the present invention will become apparent from the following portion of this specification and from the accompanying drawings, which illustrate a presently preferred embodiment incorporating the principles of the invention.

BRIEF DESCRIPTION OF THE PREFERRED EMBODIMENT

Figure 1:
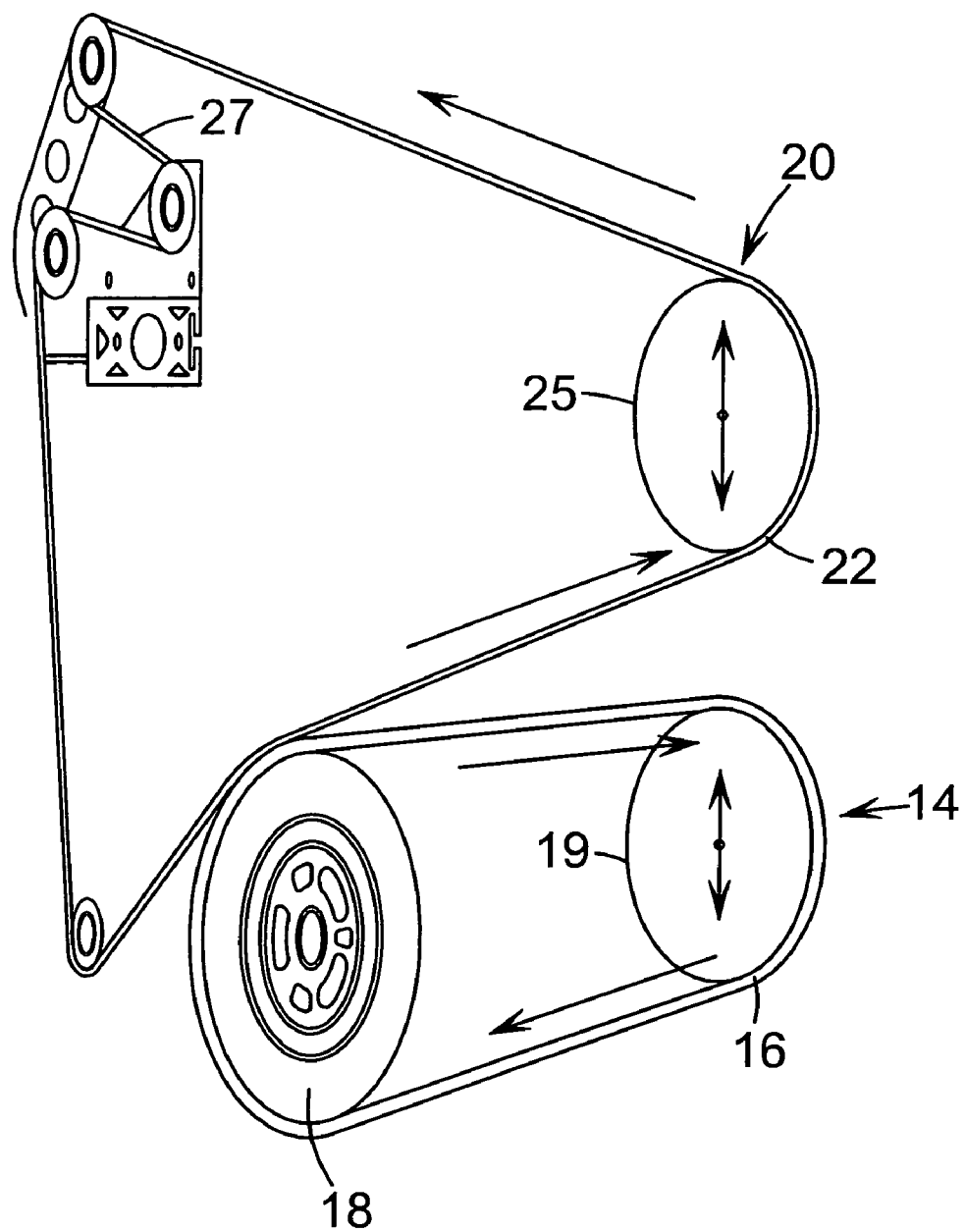
FIG. 1 is a top view of a bottle handler for use with an inspection machine.
Figure 2:
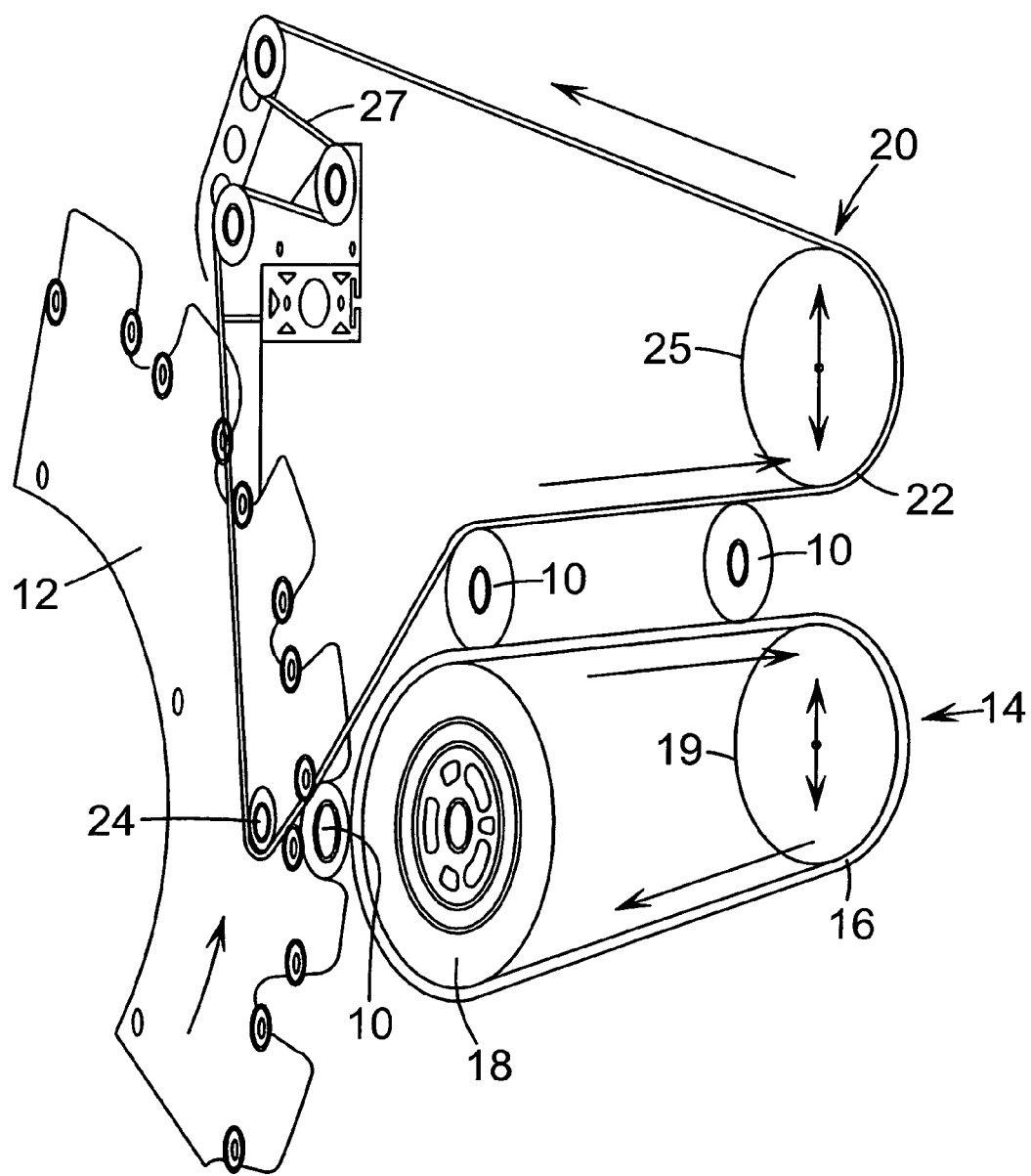
FIG. 2 is a top view of the bottle spacer shown in FIG. 1 operating with a conventional bottle inspection machine.

The inspection machine is an indexing, starwheel type machine. Containers 10 enter the starwheel 12 by use of a timing feed screw (not shown). This feed screw releases containers in time with the starwheel such that the leading container enters an open pocket. The starwheel then indexes rotationally a fixed amount and stops or dwells. Various forms of inspection take place at each dwell position. The starwheel continues the index and dwell cycle. After the last dwell station, the container is removed from the starwheel with guides on opposing sides of the container. One guide, the inner guide 14, is a moving guide in the form of a belt conveyor which can have one or a plurality of vertically spaced belts 16. This belt conveyor is supported by a pickoff wheel 18 at one end and a drive wheel 19 at the other which is driven by an appropriate motor/drive not shown.

The outer guide is a flexible serpentine belt conveyor 20 which can be single or multiple belts 22. As can be seen from the drawing, the serpentine belt conveyor is supported by a number of wheels including an idler wheel 24 and a drive wheel 25. The line connecting the axes of the pickoff 18 and idler 24 wheels is generally transverse to the path of movement of a bottle passing therebetween. The outer serpentine belt conveyor has an appropriate motor/drive (not shown) and the serpentine belt is displaced at the same velocity as the inside conveyor belt. The serpentine and belt conveyors are mutually adjustable. The serpentine belt must be sufficiently flexible so that the configuration (or line) of the belt between the idler wheel 24 and the drive wheel 25, can change as a bottle proceeds from a location between the pickoff and idler wheels clockwise around the pickoff wheel to the location where the bottle is discharged from the belts (a take-up device 27 accommodates any variation in serpentine belt length from the idler to the serpentine drive wheel). The serpentine belt drive wheel 25 and the inside belt drive wheel 19 are located relative to one another so that the belts will release a bottle simultaneously (the line between the axes of these wheels is transverse to the path of the bottle).

The bottle now travels at the same linear velocity as the belt conveyor throughout the entire outfeed. The minimum belt velocity to prevent bottle to bottle contact is cut in half. This also reduces the bottle velocity at the exit of the machine to one half the current methodology. This reduced speed substantially improves container handling. The other benefit of this manner of outfeed, is that the relatively flexible belt can accept non-round containers in many orientations and feed them out successfully.

The long serpentine belt does not necessarily engage the other belt when no bottle is located therebetween, but it may, and it, probably, works best when it does.

Case 1: The ware contact surface of the serpentine belt may rest against the ware contact surface of the inner (short) belt.

Case 2: OR for relatively small ware (<=3.5" diameter), one may place a pickoff wheel on the front side pickoff wheel mount post for the ware contact surface of the serpentine belt to rest against.

Case 3: OR for relatively large ware (>=3.5" diameter), the belt may not be supported at all.

Case 1 is preferred when the ware geometry will allow it.

Case 2 is the next best choice (for optimal outfeed performance).

Case 3 is easier to set-up than case 1 or 2 but may not perform as well.

Cases 1 and 2 will be the most common use of this system.

What is claimed is:

1. A bottle inspection machine comprising
a starwheel feeder,
an outfeed mechanism for receiving bottles from the starwheel feeder including
an inner belt conveyor operating at a desired conveyor speed having
a pickoff wheel adjacent the starwheel feeder,
a second wheel and
at least one drive belt supported between said pickoff wheel and second wheel for defining a linear outfeed belt portion leading to an exit location, and
an outer serpentine belt conveyor operating at the same desired conveyor speed having
an idler wheel, said idler wheel with said pick off wheel defining an opening for receiving a bottle displaced by said starwheel feeder,
a third wheel,
at least one flexible serpentine belt supported between said idler and third wheels,
said idler and third wheels being selectively located to define a serpentine belt path which, with said pick off wheel, defines an interference for the displacement of a bottle therebetween,
said serpentine belt being sufficiently flexible so that a bottle displaced into the opening between said pickoff and idler wheels will be conveyed by said serpentine and inner belts with the serpentine belt changing its configuration as the bottle is conveyed around said pick off wheel, and
said third wheel being located so that the serpentine belt will maintain a bottle against said linear outfeed belt portion as said bottle is conveyed to the exit location.

* * * * *